US007166849B2

(12) United States Patent
Jiang et al.

(10) Patent No.: US 7,166,849 B2
(45) Date of Patent: Jan. 23, 2007

(54) SCINTILLATOR ARRAY FOR USE IN A CT IMAGING SYSTEM AND METHOD FOR MAKING THE SCINTILLATOR ARRAY

(75) Inventors: Haochuan Jiang, Brookfield, WI (US); David Michael Hoffman, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 10/710,863

(22) Filed: Aug. 9, 2004

(65) Prior Publication Data
US 2006/0027759 A1  Feb. 9, 2006

(51) Int. Cl.
*G01T 1/24* (2006.01)
(52) U.S. Cl. .................... 250/370.11; 250/370.01; 250/370.08; 250/366; 250/367
(58) Field of Classification Search .......... 250/370.09, 250/370.11, 208.1, 368, 363.01, 370.01, 370.08, 250/366, 367; 378/98.9
See application file for complete search history.

(56) References Cited

U.S. PATENT DOCUMENTS

| 5,386,122 | A  | * | 1/1995 | Yoshida et al. ............. 250/368 |
| 6,091,795 | A  | * | 7/2000 | Schafer et al. ................ 378/19 |
| 6,144,718 | A  | * | 11/2000 | Hoffman et al. .............. 378/19 |
| 6,344,649 | B2 | * | 2/2002 | Riedner et al. ............. 250/367 |
| 6,429,414 | B1 | * | 8/2002 | Spahn ..................... 250/208.1 |
| 6,498,828 | B2 |   | 12/2002 | Jiang ........................... 378/19 |
| 6,519,313 | B2 | * | 2/2003 | Venkataramani et al. ..... 378/19 |
| 6,717,150 | B2 |   | 4/2004 | Hoffman ................ 250/370.11 |
| 6,823,038 | B2 | * | 11/2004 | Von Der Haar ............... 378/19 |
| 6,904,304 | B2 | * | 6/2005 | Hoffman ..................... 600/407 |
| 6,933,504 | B2 | * | 8/2005 | Hoffman et al. ....... 250/370.11 |
| 7,019,301 | B2 | * | 3/2006 | Homme et al. ........ 250/370.11 |

* cited by examiner

*Primary Examiner*—David Porta
*Assistant Examiner*—Faye Boosalis
(74) *Attorney, Agent, or Firm*—Cantor Colburn LLP

(57) ABSTRACT

A scintillator array for use in a CT imaging system and a method for making the scintillator array are provided. The scintillator array includes a plurality of projecting elements disposed proximate one another. The scintillator array further includes a glass compound containing a plurality of reflective particles being disposed on the plurality of projecting elements, wherein the projecting elements emit light in response to receiving x-rays.

32 Claims, 7 Drawing Sheets

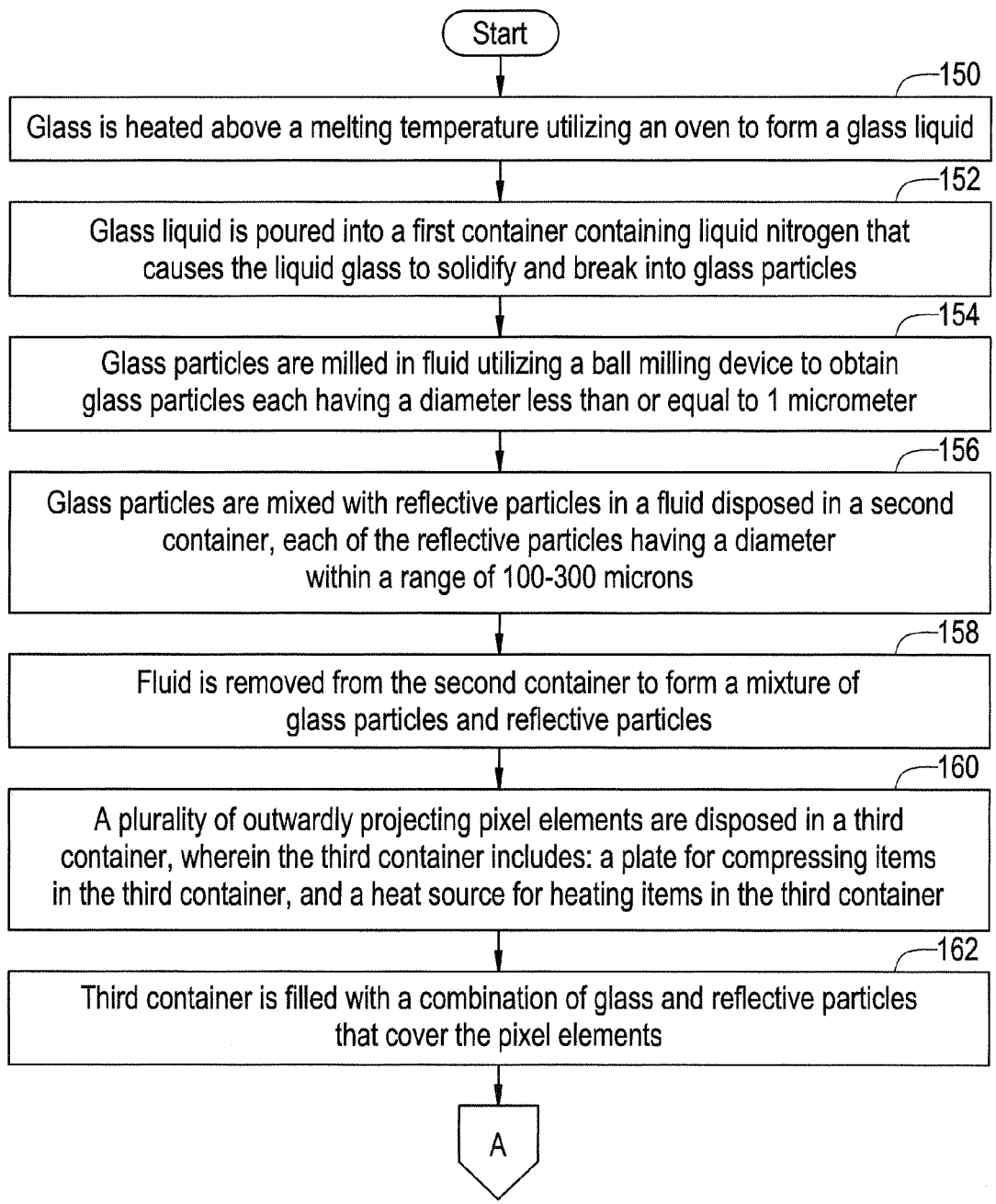

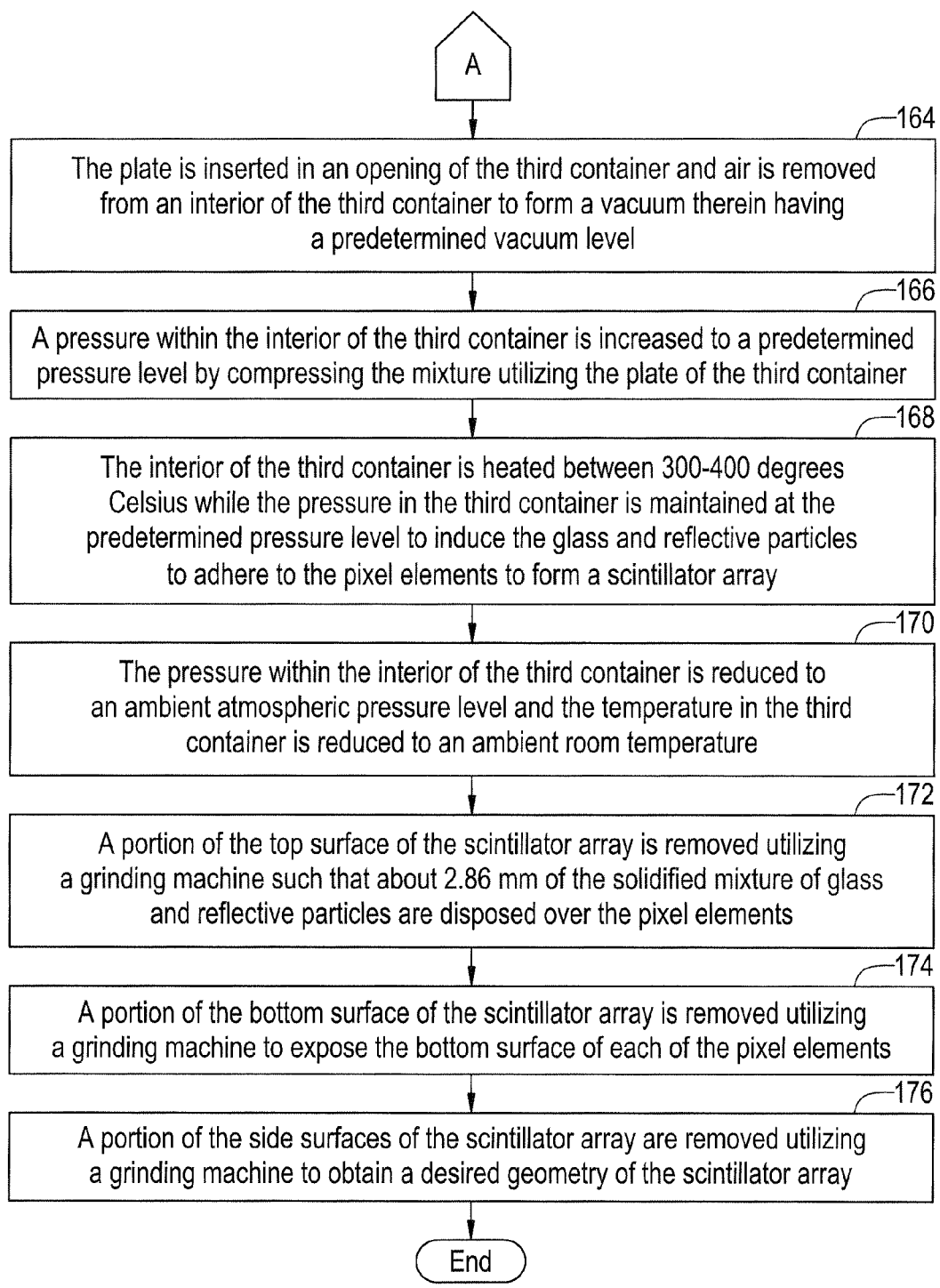

SCINTILLATOR ARRAY FOR USE IN A CT IMAGING SYSTEM AND METHOD FOR MAKING THE SCINTILLATOR ARRAY

BACKGROUND OF INVENTION

In a computed tomography (CT) system, an x-ray source projects a fan-shaped beam that is collimated to lie within an X-Y plane of a Cartesian coordinate system, termed the "imaging plane." The x-ray beam passes through the object being imaged, such as a medical patient, and impinges upon a multi-row multi-column detector array. The detector array comprises a plurality of detector elements. The intensity of the transmitted radiation is dependent upon the attenuation of the x-ray beam by the object and each detector element of the detector array produces a separate electrical signal that is a measurement of the beam attenuation. The attenuation measurements from all of the detector elements are acquired separately to produce the transmission profile.

The source and detector array in a conventional CT system are rotated on a gantry within the imaging plane around the object so that the angle at which the x-ray beam intersects the object constantly changes. A group of x-ray attenuation measurements from the detector array at a given angle is referred to as a "view" and a "scan" of the object comprises a set of views made at different angular orientations during one revolution of both the x-ray source and the detector. In an axial scan, the projection data is processed to construct an image that corresponds to a two-dimensional slice taken through the object. One method for reconstructing an image from a set of projection data is referred to as the filtered back projection technique. This process converts the attenuation measurements from a scan into integers called "CT numbers" or "Hounsfield units", that are used to control the brightness of the corresponding pixel on a cathode ray tube display.

A detector array in a CT imaging system comprises a plurality of detector modules. Each detector module has a scintillator array optically coupled to a semiconductor photodiode array. The scintillator array emits light in response to receiving x-rays. The photodiode array detects light output by the scintillator array and generates electrical signals responsive thereto. The scintillator array has a plurality of projecting elements coated with an epoxy. However, when the epoxy is curing on the ceramic scintillator array, the epoxy shrinks after adhesion occurs between the projecting elements and the epoxy. The shrinkage of the epoxy causes a relatively high stress on the interface between the epoxy and the projecting elements that can either crack the elements or deform the elements from a desired shape. Further, because the ceramic projecting elements and the epoxy have different thermal expansion properties, when they both are heated, the epoxy expands a greater amount than the ceramic projecting elements that can crack the elements.

Accordingly, there is a need for a scintillator array that has pixel elements coated with a compound that reduces or minimizes the above-identified problems.

BRIEF DESCRIPTION OF INVENTION

A scintillator array for use in a CT imaging system in accordance with an exemplary embodiment is provided. The scintillator array includes a plurality of projecting elements disposed proximate one another. The scintillator array further includes a glass compound containing a plurality of reflective particles being disposed on the plurality of projecting elements, wherein the projecting elements emit light in response to receiving x-rays.

A method for manufacturing a scintillator array for use in a CT imaging system in accordance with another exemplary embodiment is provided. The method includes mixing a plurality of glass particles with a plurality of reflective particles in a fluid to obtain a mixture. The method further includes coating a plurality of projecting elements disposed proximate one another with the mixture. The method further includes applying a pressure to the plurality of projecting elements and to the mixture. Finally, the method includes heating the plurality of projecting elements and the mixture to a predetermined temperature to form the scintillator array.

A detector module for use in a CT imaging system in accordance with another exemplary embodiment is provided. The detector module includes a scintillator array having a plurality of projecting elements disposed proximate one another and a glass compound disposed on the plurality of projecting elements. The glass compound contains a plurality of reflective particles, wherein the projecting elements emit light in response to receiving x-rays. The detector module further includes a photodiode array configured to receive light emitted from the scintillator array and to generate electrical signals responsive thereto.

BRIEF DESCRIPTION OF DRAWINGS

FIGS. 7 and 8 are flowcharts of a method for manufacturing an x-ray scintillator array in accordance with another exemplary embodiment.

DETAILED DESCRIPTION

Figure 1:
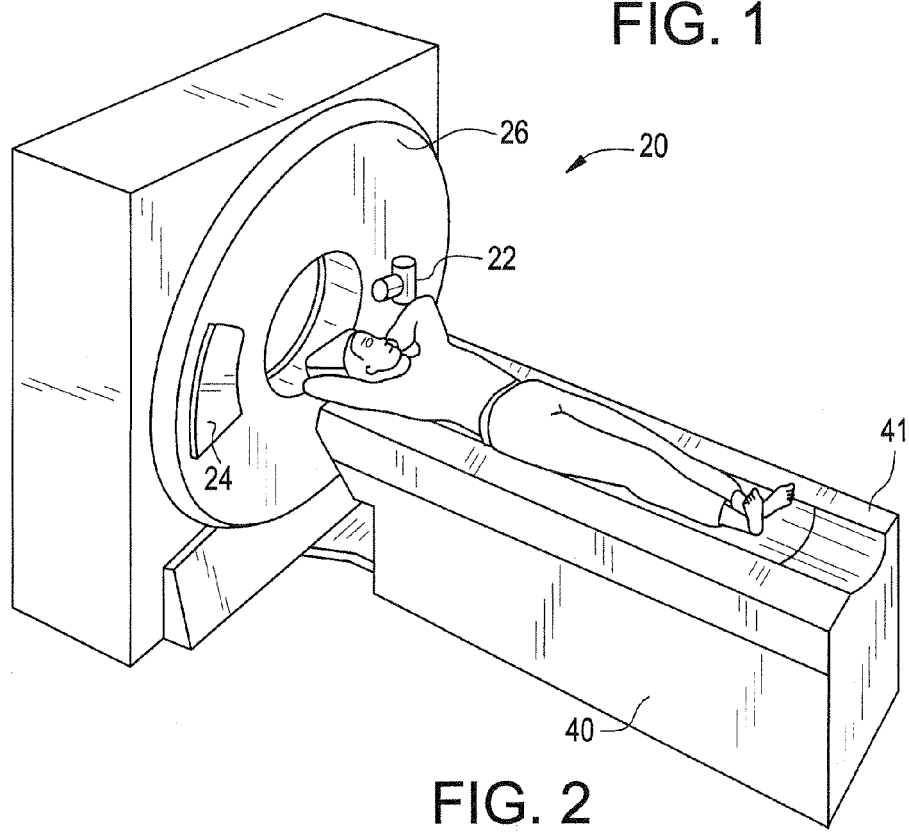
FIG. 1 is a schematic of a CT imaging system in accordance with exemplary embodiment.
Figure 2:
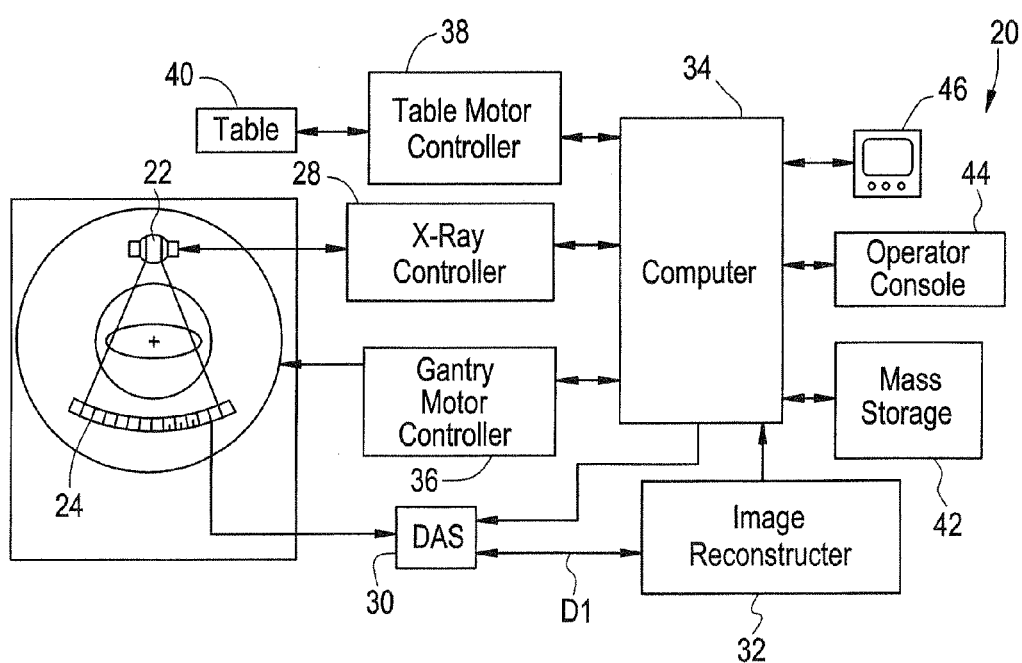
FIG. 2 is a more detailed schematic of the CT imaging system of FIG. 1.

Referring to FIGS. 1 and 2, a CT imaging system 20 for generating digital images of a person in accordance with an exemplary embodiment is shown. The CT imaging system 20 includes up an x-ray source 22, an x-ray detector array 24, a gantry 26, an x-ray controller 28, a data acquisition system 30, an image reconstructor 32, a computer 34, a gantry motor controller 36, a table motor controller 38, a table 40, a mass storage unit 42, an operator console 44, and a monitor 46.

The x-ray source 22 is provided to generate a fan-shaped x-ray beam that propagates through a person to the x-ray detector array 24. The x-ray source 22 is disposed on the gantry 26.

Figure 3:
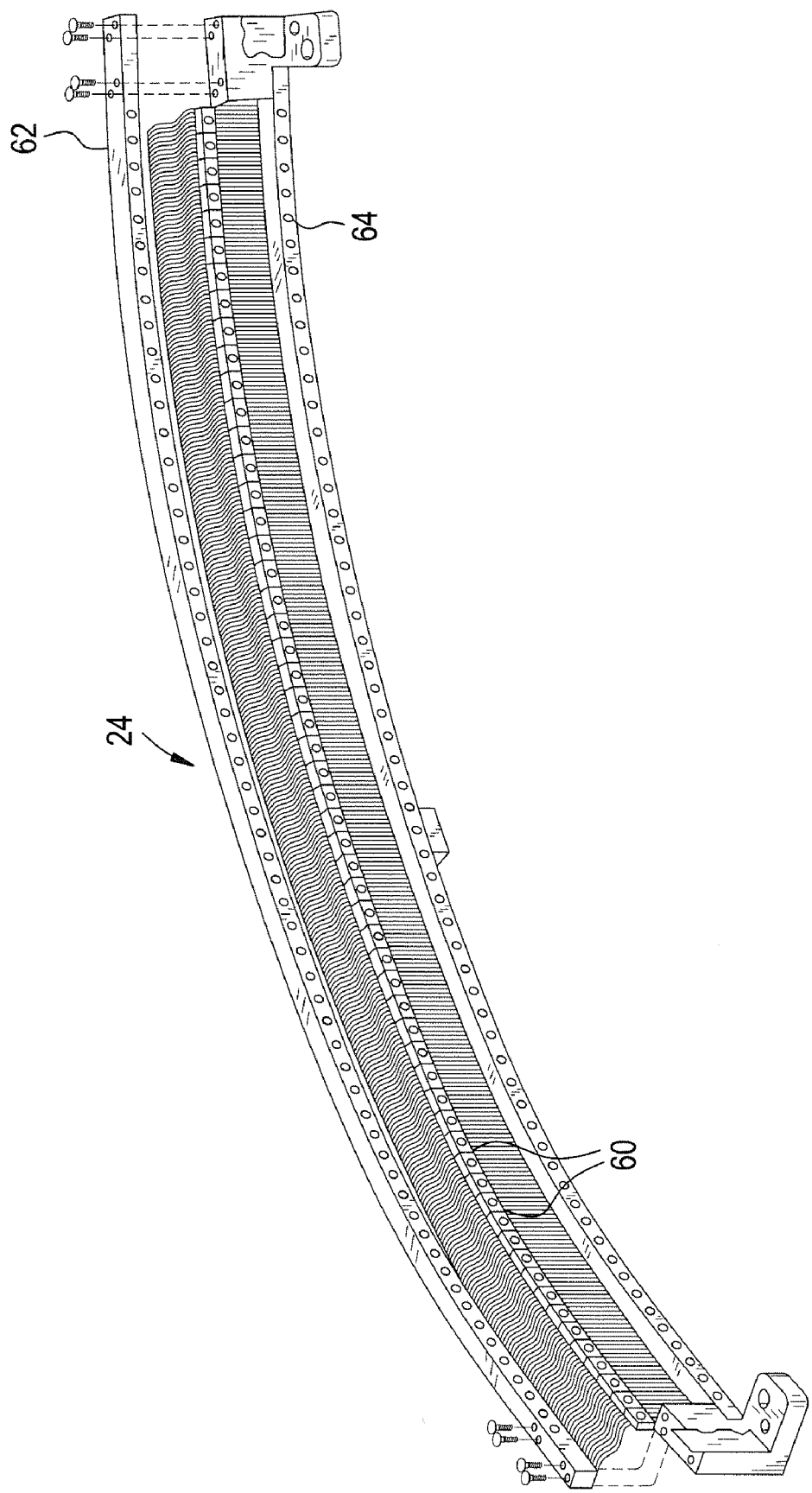
FIG. 3 is a schematic of an x-ray detector array utilized in the CT imaging system of FIG. 1.
Figure 4:
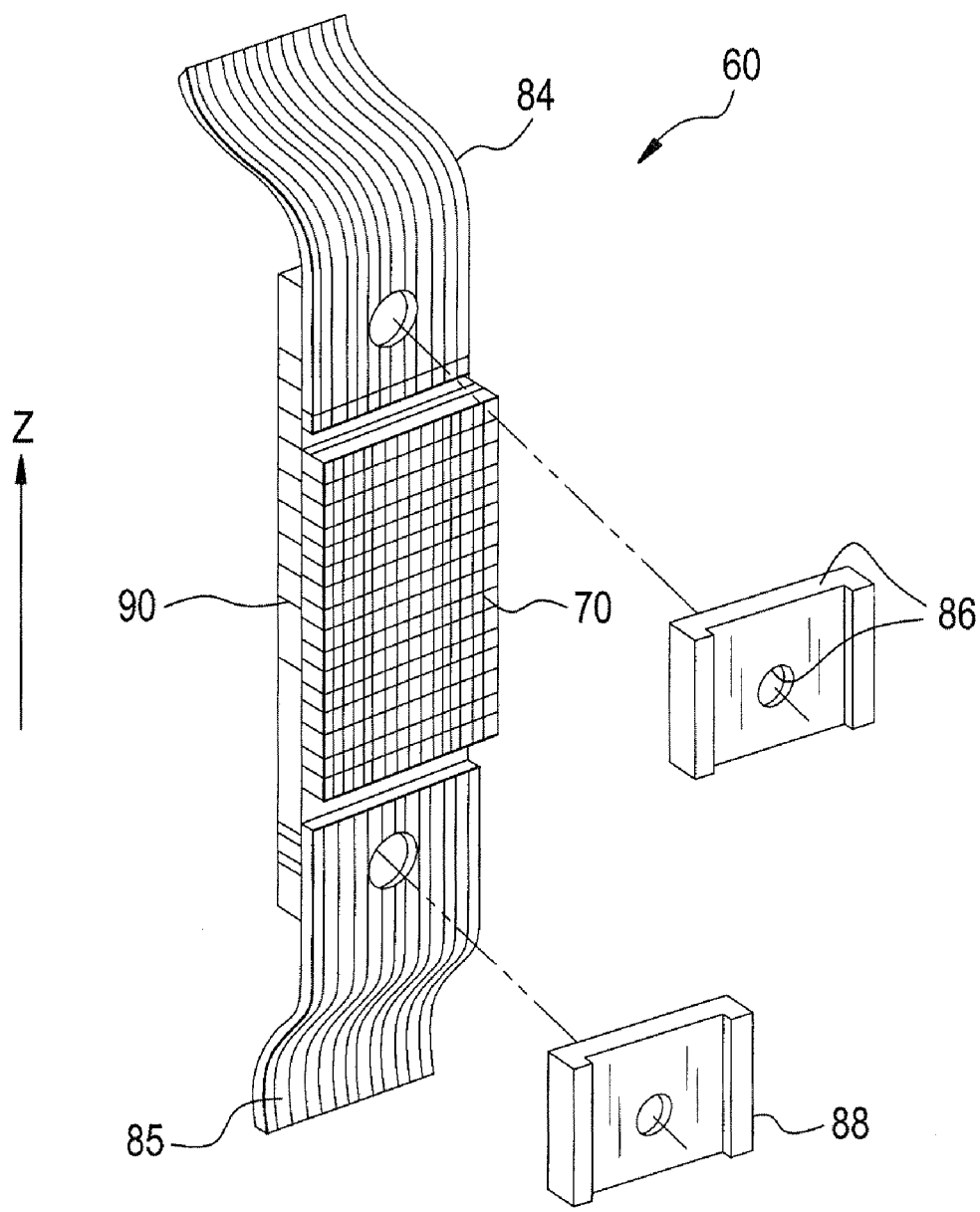
FIG. 4 is a schematic of an x-ray detector module utilized in the x-ray detector array of FIG. 3.

Referring to FIGS. 3 and 4, the x-ray detector array 24 is provided to receive attenuated x-rays from the x-ray source 22 and to generate a plurality of signals indicative of the attenuated x-rays. The x-ray detector array 24 includes a plurality of detector modules 60 disposed between rails 62, 64.

Figure 5:
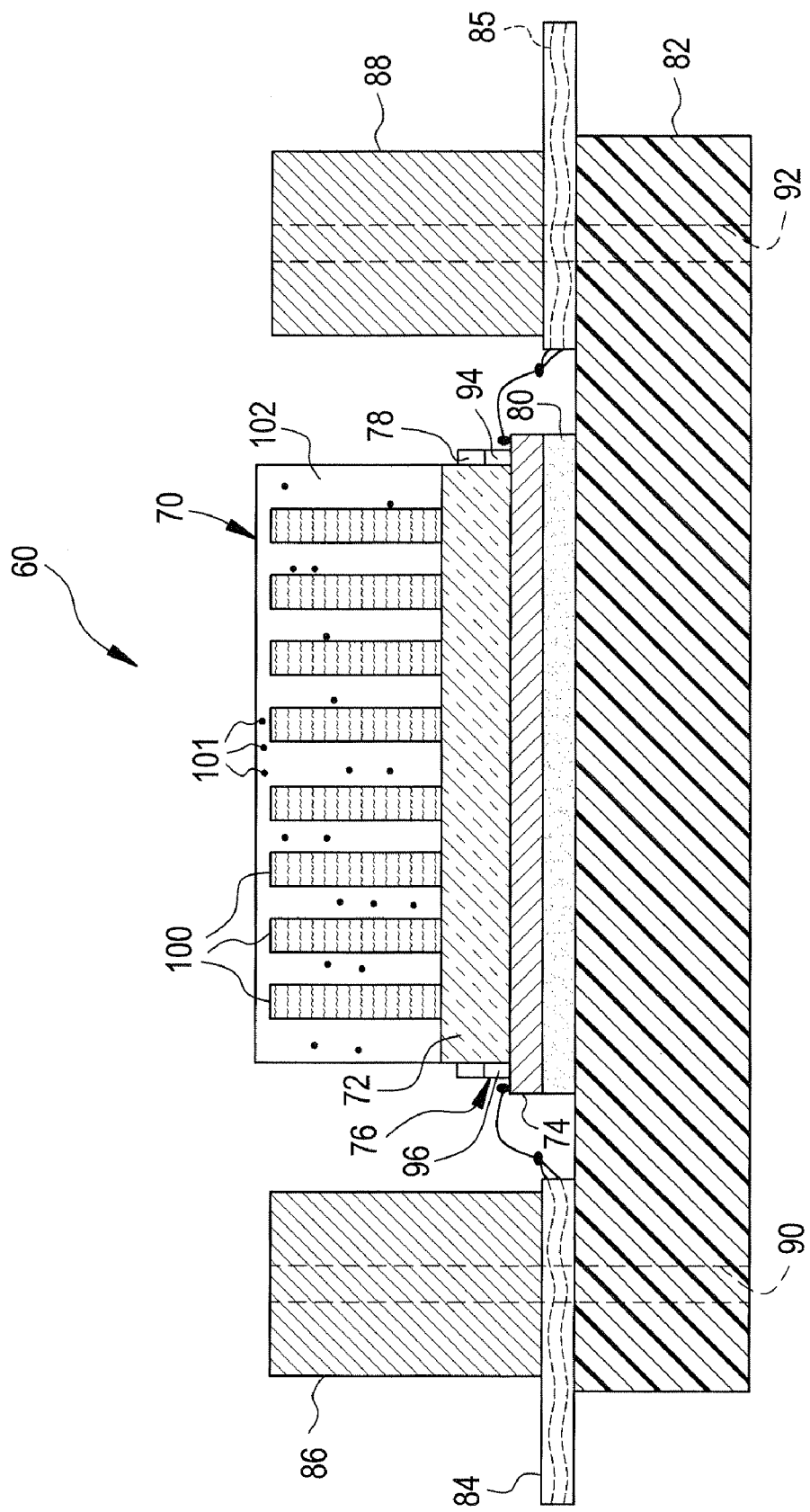
FIG. 5 is an enlarged cross-sectional view of the x-ray detector module of FIG. 3.

Referring to FIG. 5, each of the detector modules 60 is provided to generate an electrical signal in response to attenuated x-rays contacting the module 60 in accordance with an exemplary embodiment. The detector module 60 includes a scintillator array 70, a transparent film 72, a photo sensor array 74, a switch apparatus 76, a decoder 78, an epoxy layer 80, a ceramic substrate 82, electrical cables 84, 85, and mounting brackets 86, 88.

The scintillator array 70 is provided to receive attenuated x-ray beams and to generate visible light responsive thereto. The scintillator array 70 includes a plurality of outwardly projecting pixel elements 100 disposed proximate one another and a glass compound 102 disposed over and between the pixel elements 100. A substantial advantage of the glass compound 102 is that the thermal expansion characteristics of the glass compound 102 and the ceramic pixel elements 100 are substantially similar. Further, when the glass compound 102 is being cured or hardened, the glass compound 102 remains substantially the same size that prevents deformation of the pixel elements 100 when the glass compound is being cured.

The glass compound 102 comprises at least one of an oxide glass, a fluoride glass, or an oxy-fluoride glass, or the like. The glass compound 102 has a relatively low reflective index. For example, the glass compound 102 has a reflective index less than or equal to 1.6. In the illustrated embodiment, the glass compound 102 comprises an oxide glass including: $SiO_2$, $B_2O_3$, $P_2O_5$, $Bi_2O_3$, $Ga_2O_3$, $TeO_2$, $In_2O_3$, PbO, ZnO, BaO, $K_2O$, and $Na_2O$; wherein $SiO_2$ comprises 5–20 mole percent of the glass compound, $B_2O_3$ comprises 5–30 mole percent of the glass compound, $P_2O_5$ comprises 5–30 mole percent of the glass compound, $Bi_2O_3$ comprises 1–10 mole percent of the glass compound, $Ga_2O_3$ comprises 1–10 mole percent of the glass compound, $TeO_2$ comprises 1–10 mole percent of the glass compound, $In_2O_3$ comprises 0.5–5 mole percent of the glass compound, PbO comprises 1–5 mole percent of the glass compound, ZnO comprises 1–5 mole percent of the glass compound, BaO comprises 1–5 mole percent of the glass compound, $K_2O$ comprises 5–20 mole percent of the compound, and $Na_2O$ comprises 5–25 mole percent of the glass compound.

In an alternate embodiment, the glass compound 102 comprises a fluoride glass including: $ZrF_3$, $ThF_4$, $HfF_4$, $BaF_2$, $CdF_2$, $PbF_2$, $LaF_3$, $AlF_3$, NaF, KF, $ZnF_2$, $CaF_2$, $BiF_3$; wherein $ZrF_4$ comprises 5–30 mole percent of the glass compound, $ThF_4$ comprises 2–20 mole percent of the glass compound, $HfF_4$ comprises 2–15 mole percent of the glass compound, $BaF_2$ comprises 5–20 mole percent of the glass compound, $CdF_2$ comprises 1–10 mole percent of the glass compound, $PbF_2$ comprises 0.5–5 mole percent of the glass compound, $LaF_3$ comprises 2–10 mole percent of the glass compound, $AlF_3$ comprises 2–10 mole percent of the glass compound, NaF comprises 5–25 mole percent of the glass compound, KF comprises 2–10 mole percent of the glass compound, $ZnF_2$ comprises 2–15 mole percent of the glass compound, $CaF_2$ comprises 2–10 mole percent of the glass compound, and $BiF_3$ comprises 1–8 mole percent of the glass compound.

In another alternate embodiment, the glass compound 102 comprises a fluoride glass formed from mixing the oxide glass and the fluoride glass.

The glass compound 102 includes reflective particles 101 for directing light emitted from the pixel elements 100 toward the photo sensor array 74. The reflective particles are between 100–300 microns in size. Of course, the reflective particles could be less than 100 microns or greater than 300 microns in size. In one embodiment, the reflective particles 102 are $TiO_2$ particles. It should be noted, however, that reflective particles can comprise one or more of the following particle types: $TiO_2$ particles, $Ta_2O_5$ particles, PbO particles, $Bi_2O_3$ particles, $HfO_2$ particles, $WO_3$ particles $UO_2$ particles, $Yb_2O_3$ particles, Highlight (($Y_{1.67}Gd_{0.33}Eu_{0.1})O_3$) particles, gadolinium oxy-sulfide ($Gd_2O_2S$:Pr,Ce,F) particles, bismuth germanate ($Bi_4Ge_3O_{12}$) particles, lutetium orthosilicate ($LuSiO_5$:Ce) particles, gadolinium gallium garnet ($Gd_3Ga_5O_{12}$:Cr,Ce) particles. Further, between 20–60 percent of a volume of the glass compound 102 comprises the reflective particles 101.

The glass compound 102 may further include a light absorber compound, such as $Cr_2O_3$, for reducing the amount of light "cross-talk" between the pixel elements 100. Further, the glass compound 102 may include Chloride for reducing both a melting temperature of the glass compound 102 and a refractive index of the glass compound. For example, one or more of the following Chlorides can be added to the glass compound 102: ZnCl2, $CdCl_2$, NaCl, KCl, $BaCl_2$, $CaCl_2$, $PbCl_2$, and $BiCl_3$.

The transparent film 72 is provided to fixedly couple the scintillator array 70 to the photosensor array 74. The film 72 comprises a transparent epoxy disposed between the scintillator array 70 and the photosensor array 74.

The photosensor array 74 is provided to receive light emitted from the scintillator array 70 and to generate a plurality of signals responsive thereto. The photosensor array 74 comprises a photodiode array having a plurality of photodiodes. Each photodiode is operably coupled to a corresponding pixel element 100 for receiving light from the pixel element 100. The photosensor array 74 is further electrically coupled to the switch apparatus 76 and the decoder 78.

The switch apparatus 76 is operably coupled between the photosensor array 74 and the data acquisition system 30. The switch apparatus 76 is a multi-dimensional semiconductor switch array. Switch apparatus 76 comprises two switch arrays 94, 96. Switch arrays 94, 96 each include a plurality of field effect transistors (FETs) (not shown) arranged as a multidimensional array. Each FET includes an input line electrically connected to one of the respective photodiode output lines, an output line, and a control line (not shown). FET output lines and control lines are connected to lines that are electrically connected to the data acquisition system 30 via a flexible electrical cable 84. In particular, about one-half of the photodiode output lines are electrically connected to the FET input lines of the switch array 94 with the other one-half of the photodiode output lines electrically connected to the FET input lines of switch array 96. The electrical cables 84, 85 are electrically coupled to the photosensor array 74 via wire bonding.

The decoder 78 is provided to control the operation of the switch apparatus 76 to enable, disable, or combine output signals from the photosensor array 74 depending upon a desired number of slices and slice resolutions for each slice. The decoder 78 comprises a FET controller. The decoder 78 includes a plurality of output lines and control lines coupled to both the switch apparatus 76 and the data acquisition system 30. The decoder output lines are electrically coupled to the switch apparatus control lines to enable the switch apparatus 76 to transmit data from the input lines of the switch apparatus 76 to output lines of the switch apparatus 76. By utilizing decoder 78, specific FETs within switch apparatus 76 are selectively enabled, disabled, or combined to that specific output lines of photosensor array 74 are electrically connected to the data acquisition system 30. The decoder 78 enables switch apparatus 72 so that a selected number of rows of photosensor array 74 are connected to the data acquisition system 30, resulting in a selected number of slices of data being sent to the data acquisition system 30 for processing.

The ceramic substrate 82 is provided to support the remaining components of the detector module 60. In particular, the ceramic substrate 82 is fixedly coupled to the photosensor array 74 utilizing the epoxy layer 80.

The mounting brackets 86, 88 are provided to fixedly hold the cables 84, 85, respectively, against the ceramic substrate 82. An aperture 90 extends through the mounting bracket 86 and the ceramic substrate 82 to receive a screw or bolt therein. A bolt or screw is disposed within the aperture 90 to affix the mounting bracket 86 to the ceramic substrate 82. Similarly, an aperture 92 extends through the mounting bracket 88 and the ceramic substrate 82 to receive a screw or bolt therein. A bolt or screw is disposed within the aperture 92 to affix the mounting bracket 88 to the ceramic substrate 82.

Referring to FIG. 2, the gantry 26 is provided to support the x-ray source 22 and the x-ray detector array 24. In particular, the x-ray source 22 is disposed across from the x-ray detector 24 on the gantry 26. The gantry motor controller 36 induces the gantry 26 to rotate both the x-ray source 22 and the x-ray detector array 24 at a predetermined rotational speed in response to a control signal received from the computer 34.

The x-ray controller 28 is provided to control the operation of the x-ray source 22. The x-ray controller 28 is operably coupled to the x-ray source 22 and to the computer 34. The x-ray controller 28 energizes the x-ray source 22 to emit x-ray beams in response to a control signal received from the computer 34.

The data acquisition system 30 is operably coupled to the x-ray detector array 24 and is further operably coupled to the computer 34 and to the image reconstructor 32. The data acquisition system 30 receive signals (D1) from the x-ray detector array 24 and transmits the signals to the image reconstructor 32.

The image reconstructor 32 is provided to generate digital images from the signals (D1). The image reconstructor 32 is operably coupled between the data acquisition system 30 and the computer 34. The image reconstructor 32 transmits the generated digital images to the computer 34.

The gantry motor controller 36 is provided to control the rotational position of the gantry 26. As shown, the gantry motor controller 36 is operably coupled to the gantry 26 and to the computer 34. The gantry motor controller 36 generates control signals that induce a motor (not shown) within the gantry 26 to rotate the gantry 26 at a predetermined rotational speed, in response to a control signal received from the computer 34.

The table motor controller 38 is provided to control a linear position of a plate 41 disposed on the table 40. In particular, the table motor controller 38 generates control signals that induce a linear actuator (not shown) within the table 40 to move the plate 41 to a predetermined linear position, in response to a control signal received from the computer 34.

The computer 34 is operably coupled to the x-ray controller 28, the data acquisition system 30, the image reconstructor 32, the gantry motor controller 36, the table motor controller 38, the external memory 42, the operator console 44, and the computer console 46. The computer 34 generates a first control signal for inducing the table motor controller 38 to control position of the table 40. The control computer 132 generates a second control signal for inducing the x-ray controller 28 to induce x-ray source 22 to generate x-ray beams. Further, the computer 34 generates a third control signal for inducing the gantry motor controller 36 to rotate the gantry 26. Further, the computer 34 generates a fourth control signal to induce the data acquisition system 30 to sample signals received from the x-ray detector array 24. In response, the system 30 transmits the signals received from the x-ray detector array 24 to the image reconstructor 32. Thereafter, the image reconstructor 32 generates digital images based upon the signals received from the data acquisition system 30 and transmits the digital images to the computer 34. The computer 34 displays the images on the monitor 46 or stores the digital images in the mass storage unit 42, or both. The operator console 40 is operably coupled to the computer 32 to allow user to request specific digital images for viewing.

Figure 6:
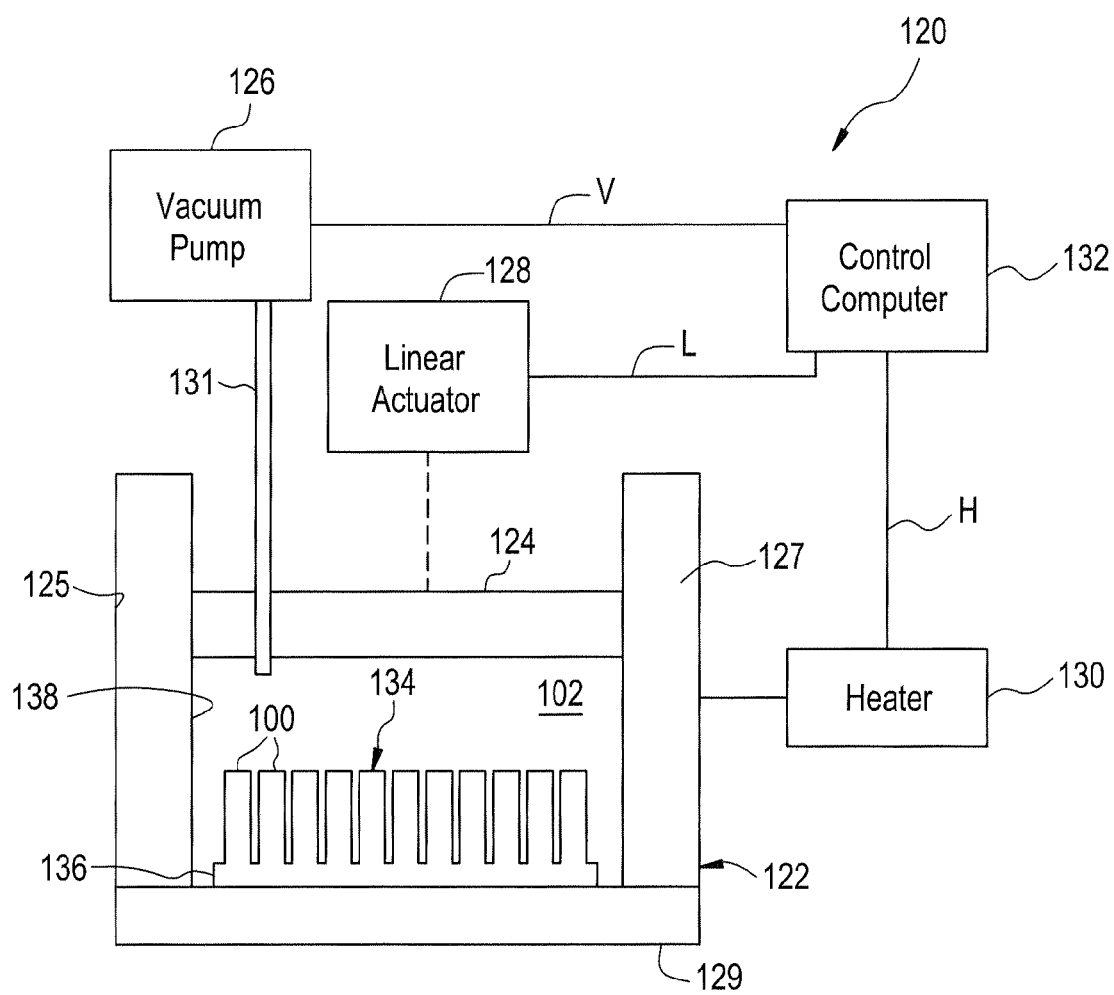
FIG. 6 is a schematic of a system for manufacturing an x-ray scintillator array.

Referring to FIG. 6, the system for manufacturing the scintillator array 70 is illustrated. The system 120 includes a container 122, a plate 124, a vacuum pump 126, a linear actuator 128, a heater 130, and a control computer 132. As shown, the scintillator array portion 134, which will be used to manufacture scintillator array 70, includes a base portion 136 holding a plurality of pixel elements 100, and a glass compound 102 disposed over and between the plurality of pixel elements 100. The scintillator array portion 134 is constructed from ceramic.

The container 122 is provided to hold the scintillator array portion 134 in an interior 138. The container 122 includes outer walls 125, 127 operably coupled to the bottom wall 129 and is constructed of a metal such stainless steel. The interior surfaces of the walls 125, 127, 129 are coated with a graphite powder before the glass compound 102 is disposed within the enclosure 136 to prevent the glass compound 102 from sticking to the interior walls of the enclosure 136.

The plate 124 is configured to be received within an opening between the walls 125, 127. The plate 124 is operably coupled to the linear actuator 128 that controls a linear position of the plate 124. After the glass compound 102 has been disposed within the enclosure 136 and air has been removed from the interior region 138, the linear actuator 128 is configured to move the plate 124 downwardly to apply a pressure to the glass compound 102 within the container 122. The linear actuator 128 induces the plate 124 to apply a pressure within a pressure range of 5–500 PSI to the glass compound 102 that is maintained for about thirty minutes in response to a control signal (L) from the computer 132. Of course, the linear actuator 128 could maintain the desired pressure for less then or greater than thirty minutes.

The vacuum pump 126 is provided to remove air from the interior region 138 after the glass compound 102 has been disposed within the interior region 138. The vacuum pump 126 is operably coupled to the interior region 138 of the enclosure 136 via the vacuum tube 131 that extends through an aperture in the plate 124. In particular, the vacuum pump 126 removes air from the interior region 138 to obtain a vacuum level of about 0.001 Torr in response to a control signal (V) from the control computer 132.

The heater 130 is provided to heat the interior region 138 of the container 122 to a predetermined temperature for curing the glass compound 102 onto the pixel elements 100. The predetermined temperature is within a temperature range of 300–400 degrees Celsius. The heater 130 is thermally coupled to at least one of the outer walls 125, 127 and produces heat in response to a control signal (H) received from the control computer 132.

The control computer 132 is operably coupled to the vacuum pump 126, the linear actuator 128, and the heater 130. The control computer 132 executes preprogrammed instructions for controlling the operation of the vacuum pump 126, the linear actuator 128, and the heater 130 to form the scintillator array 70, as will be discussed in greater detail below.

Referring to FIG. 7, a method for forming the scintillator array 70 will now be described. At step 150, glass is heated above a melting temperature utilizing an oven to form a glass liquid. As discussed above, the glass can comprise one or more of an oxide glass, a fluoride glass, or an oxy-fluoride glass.

At step 152, the glass liquid is poured into a first container (not shown) containing liquid nitrogen that causes the liquid glass to solidify and break into glass particles.

At step 154, the glass particles are milled in a fluid utilizing a ball milling device to obtain glass particles each having a diameter less than or equal to 1 micrometer.

At step 156, the glass particles are mixed with reflective particles in a fluid disposed in a second container (not shown), each of the reflective particles having a diameter within a range of 100–300 microns.

At step 158, the fluid is removed from the second container to form a mixture of glass particles and reflective particles.

At step 160, the scintillator array portion 134 having a plurality of outwardly projecting pixel elements 100 are disposed in the container 122.

At step 162, the container 122 is filled with the combination of glass and reflective particles that cover the pixel elements 100.

At step 164, the plate 124 is inserted in an opening of the container 122 and air is removed from an interior of the container 122 to form a vacuum therein having a predetermined vacuum level. In particular, after the plate 124 is inserted into the opening defined by the walls 125, 127, the vacuum pump 126 removes air from the interior region 138 of the container 122 to form a vacuum therein, in response to the control signal (V) received from the control computer 132.

At step 166, a pressure within the interior region 138 of the container 122 is increased to a predetermined pressure level by compressing the mixture utilizing the plate 124 of the container 122. In particular, the linear actuator 128 linearly moves the plate 124 against the combination of glass and reflective particles contained within the interior region 138 to increase the pressure within the region 138 to the predetermined pressure level, in response to the control signal (L) received from the control computer 132.

At step 168, the interior region 138 of the container 122 is heated between 300–400 degrees Celsius while the pressure in the container 122 is maintained at the predetermined pressure level to induce the glass and reflective particles to adhere to the pixel elements 100 to form the scintillator array 70. In particular, the heater 130 heats the interior region 138 to the desired temperature range, in response to the control signal (H) received from the control computer 132.

At step 170, the pressure within the interior region 138 of the container 122 is reduced to an ambient atmospheric pressure level and the temperature in the container 122 is reduced to an ambient room temperature and the scintillator array 70 is removed from the container 122.

At step 172, a portion of the top surface of the scintillator array 70 is removed utilizing a grinding machine (not shown) such that about 2.86 mm of the solidified mixture of glass and reflective particles are disposed over the pixel elements 100.

At step 174, a portion of the bottom surface of the scintillator array 70 is removed utilizing a grinding machine to expose the bottom surface of each of the pixel elements 100.

At step 176, a portion of the side surfaces of the scintillator array 70 are removed utilizing a grinding machine to obtain a desired geometry of the scintillator array 70.

The scintillator array for use in a CT imaging system and the method for manufacturing the scintillator array provides a substantial advantage over other scintillator arrays and methods. In particular, the scintillator array utilizes a glass compound that covers the pixel elements that has a technical effect of adhering around the pixel elements while having minimal shrinkage during the curing process. Thus, the glass compound reduces stress on the pixel elements and therefore reduces deformation of the pixel elements during the curing process to reduce and/or prevent cracking of the pixel elements. Further, because the ceramic pixel elements and the glass compound have substantially similar thermal expansion properties, the pixel elements and the glass compound expand at a similar rate to reduce and/or prevent damage of the pixel elements during operational temperature variations.

While embodiments of the invention are described with reference to the exemplary embodiments, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Moreover, the use of the term's first, second, etc. does not denote any order of importance, but rather the term's first, second, etc. are used to distinguish one element from another. Furthermore, the use of the terms a, an, etc. do not denote a limitation of quantity, but rather denote the presence of at least one of the referenced items.

What is claimed is:

1. A scintillator array for use in a CT imaging system, comprising:
   a plurality of projecting elements disposed proximate one another, the projecting elements configured to emit light in response to receiving x-rays; and
   a glass compound containing a plurality of reflective particles, the glass compound being disposed over and between the plurality of projecting elements, the glass compound including Chloride for reducing a refractive index of the glass compound.

2. The scintillator array of claim 1, wherein the projecting elements are constructed from a ceramic.

3. The scintillator array of claim 1, wherein the glass compound comprises at least one of an oxide glass, a fluoride glass, and an oxy-fluoride glass.

4. The scintillator array of claim 1, wherein the glass compound has a reflective index less than or equal to 1.6.

5. The scintillator array of claim 1, wherein substantially all of the reflective particles are 100–300 microns in diameter.

6. The scintillator array of claim 1, wherein the reflective particles comprise one or more of $TiO_2$ particles, $Ta_2O_5$ particles, PbO particles, Bi2O3 particles, HfO2 particles, WO3 particles, UO2 particles, Yb2O3 particles, and ThO2 particles.

7. The scintillator array of claim 6, wherein the reflective particles are comprise one or more of Highlight particles, gadolinium oxy-sulfide particles, bismuth germenate particles, lutetium orthosilicate particles, gadolinium gallium garnet particles.

8. The scintillator array of claim 1, wherein between 20–60 percent of a volume of the glass compound comprises the reflective particles.

9. The scintillator array of claim 1, wherein the glass compound contains a light absorber compound.

10. The scintillator array of claim 9, wherein the light absorber compound comprises Cr2O3.

11. A method for manufacturing a scintillator array for use in a CT imaging system, comprising:
mixing a plurality of particles of a glass compound with a plurality of reflective particles in a fluid to obtain a mixture;
removing the fluid from the mixture to obtain a fluidless mixture;
disposing the fluidless mixture over and between a plurality of projecting elements disposed proximate one another;
applying a pressure to the plurality of projecting elements and to the fluidless mixture; and
heating the plurality of projecting elements and the fluidless mixture to a predetermined temperature to form the scintillator array.

12. The method of claim 11, wherein the projecting elements are constructed from a ceramic.

13. The method of claim 11, wherein the glass compound comprises one of an oxide glass, a fluoride glass, and an oxy-fluoride glass.

14. The method of claim 11, wherein the glass compound has a reflective index less than or equal to 1.6.

15. The method of claim 11, wherein the glass compound contains Chloride for reducing a melting temperature of the glass compound and for reducing an refractive index of the glass compound.

16. The method of claim 11, wherein substantially all of the reflective particles are 100–300 microns in diameter.

17. The method of claim 11, wherein the reflective particles comprise one or more of TiO2 particles, Ta2O5 particles, PbO particles, Bi2O3 particles, HfO2 particles, WO3 particles, UO2 particles, Yb2O3 particles, and ThO2 particles.

18. The method of claim 17, wherein the reflective particles comprise one or more of Highlight particles, gadolinium oxy-sulfide particles, bismuth germenate particles, lutetium orthosilicate particles, gadolinium gallium garnet particles.

19. The method of claim 11, wherein between 20–60 percent of a volume of the glass compound comprises the reflective particles.

20. The method of claim 11, wherein the glass compound contains a light absorber compound.

21. The method of claim 20, wherein the light absorber compound comprises Cr2O3.

22. A detector module for use in a CT imaging system, comprising:
a scintillator array having a plurality of projecting elements disposed proximate one another, the projecting elements configured to emit light in response to receiving x-rays, and a glass compound disposed over and between the plurality of projecting elements, the glass compound containing a plurality of reflective particles and Chloride for reducing a refractive index of the glass compound; and
a photodiode array configured to receive the light emitted from the scintillator array and to generate electrical signals responsive thereto.

23. The detector module of claim 22, further comprising a ceramic substrate coupled to the photodiode array.

24. The detector module of claim 22, wherein the projecting elements are constructed from a ceramic.

25. The detector module of claim 22, wherein the glass compound comprises one of an oxide glass, a fluoride glass, and an oxy-fluoride glass.

26. The detector module of claim 22, wherein the glass compound has a reflective index less than or equal to 1.6.

27. The detector module of claim 22, wherein substantially all of the reflective particles are 100–300 microns in diameter.

28. The detector module of claim 22, wherein the reflective particles comprise one or more of TiO2 particles, Ta2O5 particles, PbO particles, Bi2O3 particles, HfO2 particles, WO3 particles, UO2 particles, Yb2O3 particles, and ThO2 particles.

29. The detector module of claim 28, wherein the reflective particles are comprise one or more of Highlight particles, gadolinium oxy-sulfide particles, bismuth germenate particles, lutetium orthosilicate particles, gadolinium gallium garnet particles.

30. The detector module of claim 22, wherein between 20–60 percent of a volume of the glass compound comprises the reflective particles.

31. The detector module of claim 22, wherein the glass compound contains a light absorber compound.

32. The detector module of claim 31, wherein the light absorber compound comprises Cr2O3.

* * * * *